April 28, 1959     C. L. TRUESDALE     2,884,053

METHOD OF SEAMING THE HEADING OF DRAPERIES

Filed March 1, 1957

INVENTOR.
CAVOUR L. TRUESDALE
BY
ATTORNEY

2,884,053
METHOD OF SEAMING THE HEADING OF DRAPERIES

Cavour L. Truesdale, Richmond, Va.

Application March 1, 1957, Serial No. 643,435

12 Claims. (Cl. 160—330)

This invention relates to the art of fabricating the heading structure of a plastic drapery.

The invention is embodied in an opaque or translucent drapery for use in controlling light in classrooms, all-purpose rooms, auditoriums in schools, churches, hospitals, and other institutions. The invention can, however, be used in any location where window draperies for light control are desired.

The principal object of this invention is to provide a drapery made of thermoplastic material having a heading attached to the main body of the drapery by means of a horizontal linear series of spot welds so formed as to prevent the material from tearing along the line of the seal.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
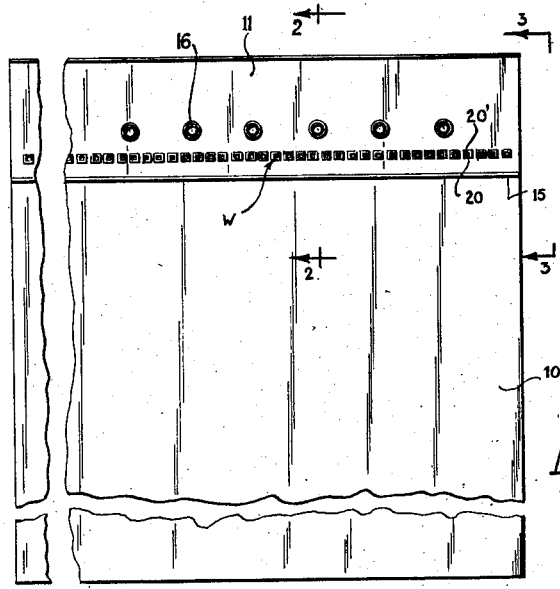
Fig. 1 is an elevational rear view of a drapery embodying the invention.
Figures 2, 7:
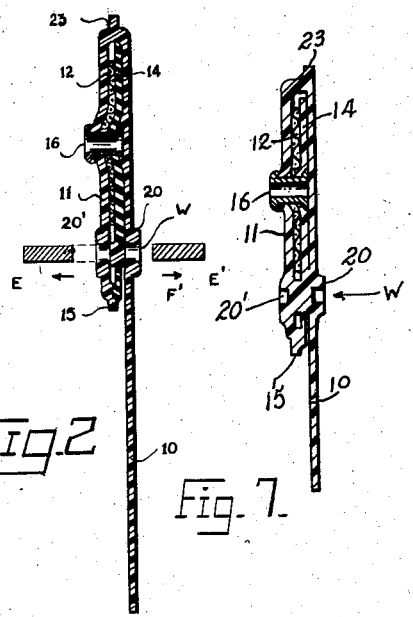
Fig. 2 is a sectional view taken on lines 2—2 of Fig. 1.
Fig. 7 is a sectional view similar to Fig. 2 of another form of the drapery embodying the invention.
Figures 4, 6:
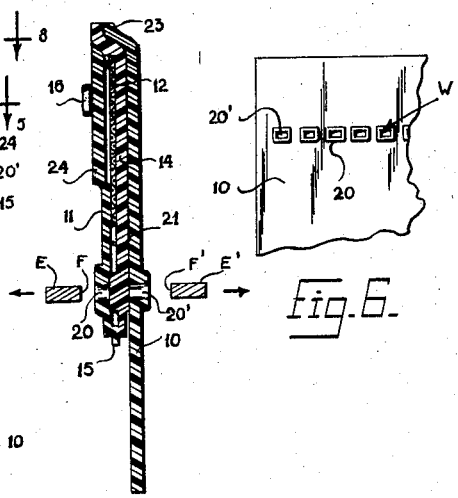
Fig. 4 is a longitudinal sectional view taken on lines 4—4 of Fig. 3.
Fig. 6 is a fragmentary elevational front view of either form of the draperies shown in Figs. 1 and 3.

In Figs. 1, 2 and 6 is shown a generally rectangular sheet 10 formed of an opaque or translucent thermoplastic material such as vinyl, polyethylene or the like. The heading of the drapery is formed as a welded structure which includes an outer or rearwardly facing strip of plastic material 11, an inner strip of stiff material 12 and an inner reinforcing strip of plastic material 14. The stiff material 12 may be buckram, crinoline or the like. The lower edges of the strips 11 and 14 may be fused together to form the integral linear seams 15. The crinoline or stiff material is then inserted between strips 11 and 14 and held in place by a plurality of uniformly spaced eyelets or grommets 16 extending through strips 11, 12 and 14 and having their rolled edges abutting layer 11 on the outside, and layer 14 on the inside. The grommets do not extend through the front face of sheet 10.

The upper part of the heading 11 and 14 is then fused to the main drapery sheet 10 at the top by a tear-resistant seal weld to form the integral linear seam 23, and just above the fused seam 15 by the line of spot welds W.

The spot welds W are formed with double beads 20, having recesses 20' aligned with each other and extending inwardly from the outer faces of sheet 10 and layer 11, respectively. These beads and recesses are formed by pressing inwardly the electrically heated electrodes E and E' which fuse them, as shown schematically in Fig. 2.

The electrodes have suitably shaped faces F and F' to provide the spot weld having the desired form. These welds W are formed with raised beads 20 which are rectangular in shape (although they may be made circular if desired) and are formed by the flow of the plastic material under the heat generated by the electrodes to provide the endless beads 20 surrounding recesses 20'.

Since the thickness of the drapery is greater at the beads 20 than the remainder of the drapery, the welds W provide joints which are stronger than the layers they join. These spot welds thus prevent the tearing of the material at the seams which is normally the weakest place in a conventional drapery. The layers do not tear at the spot weld W even if a tear is started in the material because the welds are individually formed and reinforced by the beads 20. The linear series of spot welds thus forms a much stronger seam than the conventional straight or bar seam heretofore employed.

The drapery being complete with heading may then be mounted on a rod or track by inserting suitable hooks into the grommets 16 and thence into the carriers on the tracks in conventional manner.

It will be noted that the entire heading has fused seams and is completely free from conventional stitches. The drapery may thereby be formed by high speed mass production methods with maximum strength at minimum cost.

Figure 3:
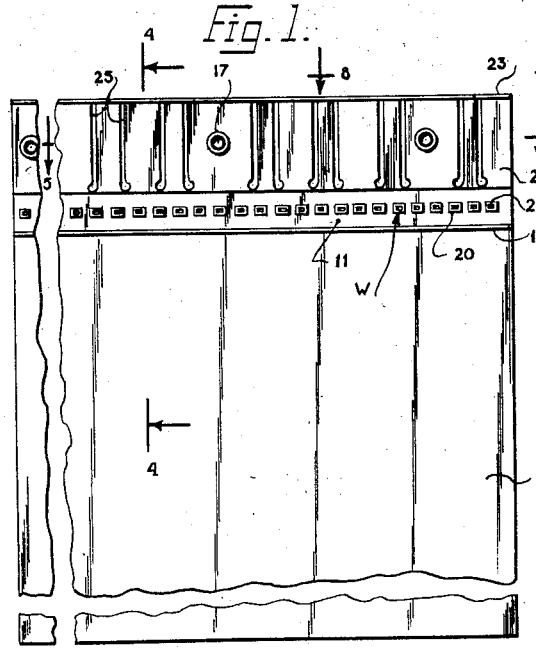
Fig. 3 is an elevational rear view of another form of the drapery embodying the invention.
Figure 5:
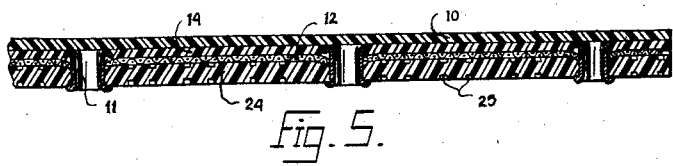
Fig. 5 is a cross-sectional view taken on lines 5—5 of Fig. 3.

The structure shown in Figs. 3, 4 and 5 is somewhat different in form from that shown in Figs. 1 and 2. The heading of this form of drapery is constructed by first welding a narrow strip of plastic 24 to strip 11 by means of a series of spaced vertical seams 25 (between which drapery hooks may be subsequently inserted). These slotted vertical seams 25 are thus used for the same purpose as the grommets 16 in Figs. 1 and 2, namely, to support the drapery on a rod or track.

The heading of the drapery is then formed as a welded structure which includes outer or rearwardly facing strips of material including one side of strip 24 and part of strip 11, an inner strip of stiff material 12 and an inner reinforcing plastic strip 14. The lower edges of the strips 11 and 14 may be fused as in Figs. 1 and 2 to form the integral linear seam 15. The crinoline or stiff material 12 is then inserted between layers 11 and 14 and held in place by small eyelets 17 extending in turn through layers 24, 11, 12 and 14, and having thin rolled edges abutting layer 24 on the outside and layer 14 on the inside. The eyelets do not extend through the front face of sheet 10. They act as vents to allow the air to escape when the draperies are opened or closed on a supporting rod or track.

The upper part of the heading formed by layers 24, 11, 14 is then fused to the main drapery sheet 10 as in Figs. 1 and 2 to form the linear seam 23.

The drapery now being complete with heading may be mounted on a rod or track by inserting drapery hooks into the vertical slots between seams 25 and thence into the carriers on the rod or track in conventional manner.

In the form of the invention shown in Fig. 7, sheet 10 is folded twice at one end to form the rearwardly facing strip 11 and inner strip 14. Each of the two folds are fused to form the integral seams 15 and 23. The stiff cloth strip 12 is disposed between the outer and inner strips 11 and 14. Eyelets 16, spaced as shown in Fig. 1, join the outer strip 11, cloth strip 12 and inner strip 14, leaving the outer sheet 10 free of seams. Fused spot welds W disposed in a line as shown in Fig. 1 join the outer strip 11, inner strip 14 and sheet 10.

It will again be noted that the entire heading has fused seams and is completely free from conventional stitches. The draperies may thereby be formed by high speed mass producing methods with maximum strength at minimum cost.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A drapery, comprising a sheet of opaque thermoplastic material, said sheet being folded twice at one end thereof to form an outer rearwardly facing strip, and an inner strip, each of the two folds being fused to form integral seams, a stiff cloth strip disposed between the outer and inner strips, a plurality of spaced eyelets joining the outer strip, the cloth strip and the inner strip leaving the outer sheet free of seams, and a line of fused spot welds joining said outer strip, inner strip and sheet.

2. A drapery, comprising a sheet of opaque thermoplastic material, a first strip of said material overlying one end of said sheet, a stiff cloth sheet disposed next to the first strip, a second strip of said material overlying the cloth sheet, and a plurality of spaced eyelets joining the first strip, the cloth sheet, and the second strip together, said sheet and second strip being joined together by a first fused seam at the top edges thereof, said first strip and second strip being joined together by another fused seam at the bottom edges thereof, said first and second strips and said sheet being joined together by a line of fused rectangular spot welds located between said other seam and said eyelets.

3. A drapery, comprising a sheet of opaque thermoplastic material, said sheet being folded at one end thereof to form a rearwardly disposed first strip, a cloth strip disposed between said sheet and said folded strip, a second strip of plastic material overlying said first strip, and a plurality of spaced eyelets joining said cloth strip, first strip and second strips together, said first strip and said sheet being fused together by a line of spot welds having endless beads located below said cloth strip, said first and second strips and said sheet being fused together at the registering top edges thereof to form an integral seam of plastic material.

4. A drapery, comprising a sheet of opaque thermoplastic material, said sheet being folded twice at one end thereof to form an outer rearwardly facing strip and an inner strip, each of the two folds being fused to form integral seams, a plurality of spaced eyelets joining the outer strip and the inner strip leaving the outer sheet free of seams, and a line of spot welds joining said outer strip, inner strip and sheet.

5. A drapery, comprising a sheet of opaque thermoplastic material, a first strip of said material overlying one end of said sheet, a second strip of said material overlying the first strip, and a plurality of spaced eyelets joining the first strip and the second strip together, said sheet and second strip being joined together by a first fused seam at the top edges thereof, said first strip and second strip being joined together by another fused seam at the bottom edges thereof, said first and second strips and said sheet being joined together by a line of fused spot welds having rectangular raised beads located between said other seam and said eyelets.

6. A drapery, comprising a sheet of opaque thermoplastic material, said sheet being folded at one end thereof to form a rearwardly disposed first strip, a second strip of plastic material overlying said first strip, and a plurality of spaced eyelets joining said first strip and second strips together, said first strip and said sheet being fused together by a line of spot welds located below said eyelets, said first and second strips and said sheet being fused together at the registering top edges thereof to form an integral seam of plastic material.

7. A drapery, comprising a sheet of opaque thermoplastic material, said sheet being folded twice at one end thereof to form an outer rearwardly facing strip and an inner strip, a stiff cloth strip disposed between the outer and inner strips, a plurality of spaced eyelets joining the outer strip, the cloth strip and the inner strip, and a line of spot welds joining said outer strip, inner strip and sheet.

8. A drapery, comprising a sheet of opaque thermoplastic material, a first strip of said material overlying one end of said sheet, a stiff cloth sheet disposed next to the first strip, a second strip of said material overlying the cloth sheet, and a plurality of spaced eyelets joining the first strip, the cloth sheet, and the second strip together, said sheet and second strip being joined together by a fused seam at the top edges thereof, said first and second strips and said sheet being joined together by a line of fused spot welds located near said eyelets.

9. A drapery, comprising a sheet of opaque thermoplastic material, a rearwardly disposed first strip overlying one end of said sheet, a cloth strip disposed between said sheet and said first strip, a second strip of plastic material overlying said first strip, and a plurality of spaced eyelets joining said cloth strip, first strip and second strips together, said first strip and said sheet being fused together by a line of spot welds located below said cloth strip, said first and second strips and said sheet being fused together at the registering top edges thereof to form an integral seam of plastic material.

10. A drapery, comprising a sheet of opaque thermoplastic material, an outer rearwardly facing strip and an inner strip overlying one end of the sheet, a stiff cloth strip disposed between the sheet and one of the outer and inner strips, a plurality of spaced eyelets joining the outer strip, the cloth strip and the inner strip, and a line of spot welds having endless beads reinforcing the welds and joining said outer strip, inner strip and sheet.

11. A drapery, comprising a sheet of opaque thermoplastic material, a first strip of said material overlying one end of said sheet, a stiff cloth sheet disposed between the sheet and the first strip, a second strip of said material overlying the first strip, and a plurality of spaced eyelets joining the first strip, the cloth sheet, and the second strip together, said sheet and first strip being joined together by a fused seam at the top edges thereof, said first strip and second strip being joined together by a plurality of pairs of transversely disposed spaced fused seams, said first and second strips and said sheet being joined together by a line of fused beaded spot welds located near said eyelets, each of said pairs of seams defining a pocket for receiving a portion of a drapery hook.

12. A drapery, comprising a sheet of opaque thermoplastic material, said sheet being folded at one end thereof to form a rearwardly disposed first strip, a cloth strip disposed between said sheet and said folded strip, a second strip of plastic material overlying said first strip, and a plurality of spaced eyelets joining said cloth strip, first strip and second strips together, said first strip and said sheet being fused together by a line of spot welds having raised endless beads located below said cloth strip and reinforcing the welds, said first and second strips and said sheet being fused together at the registering top edges thereof to form an integral straight seam of plastic material, said first and second strips being further joined together by a plurality of spaced transversely disposed fused seams arranged to secure portions of drapery hooks between the first and second strips.

References Cited in the file of this patent

UNITED STATES PATENTS

| | | |
|---|---|---|
| 2,126,834 | Steinberger | Aug. 16, 1938 |
| 2,730,161 | Langer | Jan. 10, 1956 |
| 2,748,047 | Kuss | May 29, 1956 |